Patented Oct. 7, 1952

2,613,231

UNITED STATES PATENT OFFICE 2,613,231

PREPARATION OF CYCLOOCTATETRAENE

Alfred J. Canale, Moorestown, and John F. Kincaid, Mount Holly, N. J., assignors to Rohm & Haas Company, Philadelphia, Pa., a corporation of Delaware No Drawing. Application March 9, 1950,
Serial No. 148,734

4 Claims. (Cl. 260—666)

This invention deals with the preparation of cyclooctatetraene by tetramerizing acetylene in the presence of nickel monocyanide, NiCN, as catalyst.

It was discovered by Reppe and coworkers that cycloctatetraene is formed when acetylene is heated in the presence of nickelous cyanide, $Ni(CN)_2$, suspended in tetrahydrofurane in the presence of calcium carbide or ethylene oxide. Great stress was placed upon the necessity of anhydrous conditions. The reaction as carried out was slow, not particularly efficient in time or materials, and not truly reproducible. For the practical preparation of cyclooctatetraene it is almost essential that shortcomings and difficulties of the art be corrected or avoided.

We have found that cyclooctatetraene is formed at a relatively rapid rate and in a reproducible manner by tetramerizing acetylene at 100 to 600 p. s. i. by heating it in the presence of nickel monocyanide at 90° to 150° C., preferably between 110° and 150° C. The nickel monocyanide is wet with a water-miscible organic solvent such as dioxane or tetrahydrofurane and may be mixed therewith in amounts of 0.1 part by weight to 20 parts per 100 parts of the solvent.

In a preferred method nickel monocyanide is prepared from $K_2Ni(CN)_4$ or $Na_2Ni(CN)_4$ by reduction with potassium or sodium metal in liquid ammonia. A red precipitate, $K_2Ni(CN)_3$ or the comparable sodium salt, is formed and is separated. The precipitate is dissolved in a minimum amount of air-free water and this solution is poured with vigorous agitation into cooled (0°–15° C.) hydrochloric acid about 5 normal in strength. A precipitate of NiCN is formed and is separated, as by centrifuging. The solid is washed until free of acid with deaerated water which is then displaced with a water-miscible solvent. Dioxane, tetrahydrofurane, and other water-miscible anhydrous organic solvents, which are also useful as solvents in the tetramerization reaction, are examples of solvents suitable for this purpose.

When the nickel monocyanide is used immediately after preparation, there is no induction period for formation of cyclooocctatetraene. When the catalyst is "aged," a short induction period is usually observed. With nickel monocyanide as catalyst, the rate of tetramerization is many times that experienced with $Ni(CN)_2$. For instance, with nickelous cyanide under conditions of the art 4 to 5 grams per liter-hour was found to be the rate of tetramerization. When nickel monocyanide is used at 115° C. under otherwise similar conditions except that the nickel monocyanide is taken in an amount which is one fifth of the weight of nickelous cyanide, the rate is 60 grams per liter-hour.

Solvents which are useful for wetting and suspending the nickel monocyanide include not only dioxane and tetrahydrofurane which have been mentioned but also water-miscible diethers of glycols, such as the dimethyl ethers of ethylene glycol, diethylene glycol, triethylene glycol, tetraethylene glycol, propylene glycol, or dipropylene glycol, diethyl ethers of these glycols, mixed methyl and ethyl ethers thereof, and mixtures of the various diethers. Another type of ether comprises acetals, such as dibutyl acetal, dipropyl acetal, diethyl formal, dibutyl formal, etc.

To the mixture of nickel monocyanide and solvent there may be added pulverized calcium carbide. An amount from 0.5 gram to 5 grams per 100 parts of solvent provides a satisfactory range. The calcium carbide reacts with any water which may be present in the nickel monocyanide after solvent has been added thereto. The calcium hydroxide which then results can take up any trace of acid which might have been left in the catalyst. The use of calcium carbide thus permits a less critical washing of the nickel monocyanide and displacement of water by solvent. After thorough washing with water and repeated rinsing with solvent the use of calcium carbide is not essential even though there appears to be some slight advantage in ensuring alkalinity, as by its use.

Acetylene is used under pressures of 100 to 600 pounds per square inch. The reaction is desirably initiated at the lowest practical pressure and then the pressure may be increased. A range of 300 to 500 pounds per square inch for the partial pressure of the acetylene is preferred. Precautions for handling acetylene have ben described at length in the art. Essential precautions include use of narrow tubes and/or dilution with inert gas or vapor.

In carrying out the tetramerization of acetylene a pressure vessel must be used. It is charged with a mixture of catalyst and solvent. The vessel is swept out with an inert gas such as nitrogen to displace air. The inert gas may be displaced with acetylene before or after heating. The charge of catalyst and solvent is heated to 90° to 160° C. and acetylene is run in slowly at gradually increasing pressure. It is desirable to initiate the reaction at a relatively low pressure. Too rapid application of pressure may sometimes cause an explosion. After reaction has started, pressure can be increased. Acetylene is pressured in until the rate of reaction falls off or becomes negligible. The vessel is then cooled and vented.

The reaction mixture is placed in a still and distilled at low pressure. The distillate is washed with water to remove water-miscible solvent, dried, and fractionally distilled. Pure cyclooctatetraene is thus obtained, boiling at about 143° C.

Further details of the preparation of cyclooctatetraene by the method of this invention will be found in the following illustrative examples:

Example 1

A slurry was prepared from 0.5 part by weight of freshly prepared nickel monocyanide, 5 parts of pulverized calcium carbide and 100 parts of anhydrous dioxane. This slurry was placed in a high pressure rocker bomb which was sealed, swept with nitrogen, and heated to 115° C. Acetylene was slowly admitted. Gas absorption began immediately. Gradually the pressure of acetylene was raised to 500 p. s. i. and maintained between 300 and 500 p. s. i. by occasional introduction of acetylene. The acetylene was taken from a cylinder, passed over activated charcoal to remove acetone vapors, and over activated alumina, compressed, and run into the bomb as needed. After two hours the preparation was discontinued. The bomb was cooled and the acetylene vented. The reaction mixture was distilled at one mm. pressure. The distillate was washed with water to remove dioxane. The organic layer was separated, dried over calcium chloride, and distilled. There were obtained 6 parts by weight of benzene and 14 parts of cyclooctatetraene. Some polymeric material was obtained as a residue in the first distillation.

Example 2

Nickel monocyanide was prepared by dissolving 6.7 grams of $K_2Ni(CN)_4$ in 400 ml. of liquid ammonia, adding 0.5 gram of metallic potassium in small portions to form a red precipitate, decanting off the ammonia, taking up the red precipitate of $K_2Ni(CN)_3$ in water which had been boiled to free it of air, acidifying the resulting solution with 5 N hydrochloric acid cooled to 15° C., and separating and washing the resulting NiCN with deaerated water. While this product could have been used as in Example 1, it was stored under water for 20 hours before use. The water was decanted from the nickel monocyanide which was then washed several times with dioxane.

A slurry was made with 0.5 gram of the "aged" nickel monocyanide, 5 grams of pulverized calcium carbide, and 100 parts of anhydrous dioxane. The slurry was placed in a high pressure rocker bomb, which was sealed, swept out with nitrogen, and heated to 115° C. Acetylene was slowly run into the bomb to a pressure of 500 p. s. i. After about 20 minutes the temperature of the charge began to rise, indicating that an exothermic reaction had started. Acetylene absorption began at this time. The pressure was maintained between 300 and 500 p. s. i. by introduction from time to time of acetylene at 500 p. s. i. After 2.5 hours the reaction was interrupted by cooling the bomb to 25° C. and venting the acetylene. The reaction mixture was distilled at one mm. pressure. No polymeric by-products were here obtained as residue. The distillate was washed with water, separated, dried, and fractionally distilled. There were obtained 9 grams of cyclooctatetraene and 2.5 grams of benzene.

The above examples illustrate typical procedures for preparing cyclooctatetraene by the process of this invention. The process is characterized by positive, dependable production of the desired product. It depends upon contacting acetylene under pressure with nickel monocyanide between 90° and 160° C., preferably in the presence of a high boiling, water-miscible anhydrous solvent. The ether solvents are particularly desirable. Calcium carbide may be added to ensure an anhydrous state and react with any acid which might have been left in the nickel monocyanide catalyst. When the catalyst has been stored under water prior to its use, there appears to be little tendency for the formation of polymeric residues.

We claim:

1. A process for preparing cyclooctatetraene which comprises tetramerizing acetylene by contacting it with nickel monocyanide at 90° to 150° C. under a pressure of 100 to 600 pounds per square inch.

2. A process for preparing cyclooctatetraene which comprises tetramerizing acetylene by contacting it with nickel monocyanide in the presence of a high boiling water-miscible anhydrous organic solvent at 110° to 150° C. under a pressure of 300 to 500 pounds per square inch.

3. A process for preparing cyclooctatetraene which comprises tetramerizing acetylene by contacting it with nickel monocyanide in the presence of calcium carbide and of a high boiling water-miscible anhydrous organic solvent at 110° to 150° C. under a pressure of up to 500 pounds per square inch.

4. A process for preparing cyclooctatetraene which comprises tetramerizing acetylene by contacting it with a nickel monocyanide catalyst in the presence of calcium carbide and of a high boiling water-miscible anhydrous ether solvent at 110° C. to 150° C. under an acetylene pressure of 300 to 500 pounds per square inch, the said catalyst having been stored under water prior to its use into the reaction mixture.

ALFRED J. CANALE.
JOHN F. KINCAID.

REFERENCES CITED

The following references are of record in the file of this patent:

Polymerization of Acetylene to Cyclooctatetraene by K. Kammermeyer, Fiat Final Report No. 967, Feb. 28, 1947, pages 1–9 and 33–37.

Cyanogen Compounds by H. F. Williams, Edward Arnold and Company, London, 2nd edition, pages 141 and 142.